(12) United States Patent
Aitken et al.

(10) Patent No.: US 11,502,330 B2
(45) Date of Patent: *Nov. 15, 2022

(54) REACTIVE SINTERING OF CERAMIC LITHIUM-ION SOLID ELECTROLYTES

(71) Applicant: CORNING INCORPORATED, Corning, NY (US)

(72) Inventors: Bruce Gardiner Aitken, Corning, NY (US); Michael Edward Badding, Campbell, NY (US); George Halsey Beall, Big Flats, NY (US); Curtis Robert Fekety, Corning, NY (US); Lanrik Wayne Kester, Savona, NY (US); Robert Michael Morena, Lindley, NY (US); Zhen Song, Painted Post, NY (US)

(73) Assignee: CORNING INCORPORATED, Corning, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 17/194,775

(22) Filed: Mar. 8, 2021

(65) Prior Publication Data

US 2021/0202980 A1 Jul. 1, 2021

Related U.S. Application Data

(60) Continuation of application No. 16/523,327, filed on Jul. 26, 2019, now abandoned, which is a division of
(Continued)

(51) Int. Cl.
*H01M 10/0525* (2010.01)
*C03B 19/06* (2006.01)
(Continued)

(52) U.S. Cl.
CPC ......... *H01M 10/0525* (2013.01); *B82Y 30/00* (2013.01); *C03B 19/06* (2013.01);
(Continued)

(58) Field of Classification Search
CPC ...... H01M 10/0562; C03B 19/06; C03C 3/16; C03C 3/253; C04B 35/447
See application file for complete search history.

(56) References Cited

U.S. PATENT DOCUMENTS 4,113,928 A 9/1978 Virkar et al.
4,985,317 A 1/1991 Adachi et al.
(Continued)

FOREIGN PATENT DOCUMENTS

CN 101040401 A 9/2007
CN 101076914 A 11/2007
(Continued)

OTHER PUBLICATIONS

Aono, et al., "Electrical Property and Sinterability of LiTi.sub.2(PO.sub.4).sub.3 Mixed with Lithium Salt (Li.sub.3PO.sub.4 or Li.sub.3BO.sub.3)", Solid State Ionics, 47, (1991) pp. 257-264.
(Continued)

*Primary Examiner* — Jonathan G Jelsma
(74) *Attorney, Agent, or Firm* — Kevin M. Johnson

(57) ABSTRACT

A method of forming a solid, dense, hermetic lithium-ion electrolyte membrane comprises combing an amorphous, glassy, or low melting temperature solid reactant with a refractory oxide reactant to form a mixture, casting the mixture to form a green body, and sintering the green body to form a solid membrane. The resulting electrolyte membranes can be incorporated into lithium-ion batteries.

19 Claims, 5 Drawing Sheets

Related U.S. Application Data application No. 13/306,011, filed on Nov. 29, 2011, now Pat. No. 10,411,288.

(51) Int. Cl.

| | |
|---|---|
| *C03C 3/16* | (2006.01) |
| *C03C 3/253* | (2006.01) |
| *H01M 10/0562* | (2010.01) |
| *B82Y 30/00* | (2011.01) |
| *C03C 8/14* | (2006.01) |
| *C03C 8/20* | (2006.01) |
| *C04B 35/447* | (2006.01) |

(52) U.S. Cl.
CPC ............... *C03C 3/16* (2013.01); *C03C 3/253* (2013.01); *C03C 8/14* (2013.01); *C03C 8/20* (2013.01); *C04B 35/447* (2013.01); *H01M 10/0562* (2013.01); *C04B 2235/3201* (2013.01); *C04B 2235/3203* (2013.01); *C04B 2235/3217* (2013.01); *C04B 2235/3232* (2013.01); *C04B 2235/3244* (2013.01); *C04B 2235/3287* (2013.01); *C04B 2235/3293* (2013.01); *C04B 2235/36* (2013.01); *C04B 2235/5445* (2013.01); *C04B 2235/5454* (2013.01); *C04B 2235/77* (2013.01); *C04B 2235/785* (2013.01)

(56) References Cited

U.S. PATENT DOCUMENTS

| | | | |
|---|---|---|---|
| 5,094,577 | A | 3/1992 | Clark et al. |
| 5,094,677 | A | 3/1992 | Morena |
| 6,030,909 | A | 2/2000 | Fu |
| 6,228,803 | B1 | 5/2001 | Gadkaree et al. |
| 6,770,111 | B2 | 8/2004 | Morena et al. |
| 2007/0087269 | A1 | 4/2007 | Inda |
| 2007/0117026 | A1 | 5/2007 | Kumar et al. |
| 2007/0172739 | A1 | 7/2007 | Visco et al. |
| 2007/0176332 | A1 | 8/2007 | Swartzlander et al. |
| 2007/0231704 | A1 | 10/2007 | Inda |
| 2007/0259271 | A1 | 11/2007 | Nanno et al. |
| 2008/0268346 | A1 | 10/2008 | Inda |
| 2008/0292968 | A1 | 11/2008 | Lee et al. |
| 2009/0081554 | A1 | 3/2009 | Takada et al. |
| 2009/0081555 | A1 | 3/2009 | Teramoto |
| 2009/0291365 | A1 | 11/2009 | Iacovangelo et al. |
| 2009/0317724 | A1 | 12/2009 | Kumar et al. |
| 2010/0248028 | A1 | 9/2010 | Riley et al. |
| 2010/0323118 | A1 | 12/2010 | Mohanty et al. |
| 2011/0051315 | A1 | 3/2011 | Dogan |
| 2011/0177397 | A1 | 7/2011 | Ogasa |
| 2012/0009483 | A1 | 1/2012 | Chu et al. |
| 2012/0135289 | A1 | 5/2012 | Noda |

FOREIGN PATENT DOCUMENTS

| | | | |
|---|---|---|---|
| CN | 101786873 | A | 7/2010 |
| EP | 2469623 | A1 | 6/2012 |
| JP | 3029206 | B2 | 4/2000 |
| JP | 2002-151142 | A | 5/2002 |
| JP | 2008-091328 | A | 4/2008 |
| JP | 2008-171705 | A | 7/2008 |
| JP | 2008-171706 | A | 7/2008 |
| JP | 2009-080970 | A | 4/2009 |
| JP | 2009-187911 | A | 8/2009 |
| JP | 2009-193894 | A | 8/2009 |
| JP | 2010-006681 | A | 1/2010 |
| JP | 2010-010110 | A | 1/2010 |
| JP | 2010-205449 | A | 9/2010 |
| JP | 2011-003500 | A | 1/2011 |
| JP | 2011-150817 | A | 8/2011 |
| KR | 10-2007-0041358 | A | 4/2007 |
| WO | 2007/075867 | A2 | 7/2007 |

OTHER PUBLICATIONS

Aono, et al., "Ionic Conductivity of the Lityium Titanium Phosphate (Li$_{1+x}$M$_x$Ti$_{2-x}$(PO$_4$)$_3$, M=Al, Sc, Y, and La) Systems", J. Electrochem. Soc., vol. 136, No. 2, (1989), pp. 590-591.

Barre, et al., "The NASTCON Solid Solution Li$_{1-x}$La$_{x/3}$Zr$_2$(PO$_4$)$_3$: optimisation of the sintering process and ionic conductivity measurements", Ionics, 15, (2009), pp. 681-687.

CN201280067770.7 First Office Action dated Feb. 29, 2016, China Patent Office.

CN201280067770.7 Fourth Office Action dated Apr. 13, 2018, China Patent Office.

CN201280067770.7 Office Action dated Sep. 22, 2017, China Patent Office.

CN201280067770.7 Second Office Action dated Jan. 16, 2017, China Patent Office.

EP12799439.0 Office Action dated Mar. 13, 2017, European Patent Office.

European Patent Application No. 12799439.0 Communication pursuant to Article 94(3) EPC dated Mar. 13, 2017; 7 Pages; European Patent Office.

European Patent Application No. 12799439.0 Communication under Rule 71(3) EPC dated Dec. 19, 2018; 7 Pages; European Patent Office.

European Patent Application No. 12799439.0 Decision to grant a European patent pursuant to Article 97(1) EPC dated May 16, 2019; 2 Pages.

Fu, J., "Superionic conductivity of glass-cermaics in the system Li2O—Al2O3—TiO2—P2O5", Solid State Ionics 96 (1997) p. 195-200.

He et al., "Effects of B-site ion (M) substitution on the ionic conductivity of (Li$_{3x}$La$_{2/3-x}$)1 +y/2(M$_y$Ti$_{1-y}$)O3 (M=Al, Cr)", Electrochimica Acta, vol. 48, No. 10, Apr. 30, 2003, pp. 1357-1366.
http://www.chemicalbook.com/ProductMSDSDetailCB6260598_EN.htm Accessed 2014.

IN4808/DELNP/2014 First Examination Report dated Apr. 30, 2019, India Patent Office.

International Search Report and Written Opinion of the International Searching Authority; PCT/US12/66968; dated Feb. 6, 2013; 11 Pages; European Patent Office.

Japanese Patent Application No. 2017250681; Machine Translation of the Office Action dated Sep. 18, 2019; Japan Patent Office; 3 Pgs.

JP2014544865 Office Action dated Jun. 27, 2017, Japan Patent Office.

JP2017250681 Office Action dated Jan. 30, 2019, Japan Patent Office.

Kobayashi, et al., Ionic conductivity enhancement in LiTi$_2$(PO$_4$)$_3$-based composite electrolyte by the addition of lithium nitrate, Journal of Power Sources, 68, (1997), pp. 407-411.

Korean Patent Application No. 10-2014-7017973 Notice of Allowance dated Dec. 21, 2020; 4 Pages; (1 page of English Translation and 3 pages of Original Document) Korean Patent Office.

KR1020147017973 Office Action dated Jan. 24, 2019, Korea Patent Office, 3 Pgs.

Kumar et al., "Ionic conduction through heterogeneous solids: Delineation of the blocking and space charge effects", Journal of Power Sources, vol. 160, No. 2, Oct. 6, 2006, pp. 1329-1335.

Mazurin et al. Handbook of Glass Data Part D, Ternary Non-Silicate Glasses. Elsevier, p. 582.

Takeuchi et al. "Densification and conductivity enhancement of Na4Zr2Si3O12-based solid electrolytes using TiO2 as a sintering aid", Solid State Ionics 120 (1999) pp. 33-41.

The State Intellectual Property Office of The People's Republic of China; Notice on the First Office Action for Application No. 201280067770.7; dated Feb. 29, 2016.

Visco, et al., "Lithium-Air", Encyclopedia of Electrochemical Power Sources, J. Garche (Ed.), (2009), pp. 376-382.

Chinese Patent Application No. 201910476750.9, Office Action dated May 17, 2021, 11 pages (5 pages of English Translation and 6 pages of Original Document), Chinese Patent Office.

(56) References Cited

OTHER PUBLICATIONS

Chinese Patent Application No. 201910476750.9, Decision on Rejection, dated Apr. 18, 2022, 3 pages, Chinese Patent Office.
Wang Xiaomin, "Engineering Material", Harbin Institute of Technology Press, May 1998, pp. 202.
Wu Yunshu, "fundamentals of material science and engineering", Mechanical Industry Press, Oct. 1990, pp. 167-168.

REACTIVE SINTERING OF CERAMIC LITHIUM-ION SOLID ELECTROLYTES

CROSS-REFERENCE TO RELATED APPLICATIONS

This application is a continuation of and claims the benefit of priority to U.S. application Ser. No. 16/523,327, filed on Jul. 26, 2019, which is divisional application of U.S. application Ser. No. 13/306,011, filed Nov. 29, 2011, now U.S. Patent No. 10,411,288, and claims the benefit of priority thereto under 35 U.S.C. § 120, the contents of both of which are relied upon and incorporated herein by reference in their entirety.

BACKGROUND

The present disclosure relates generally to the formation of ceramic lithium-ion solid electrolytes, and more specifically to a reactive sintering process for forming dense, hermetic electrolyte membranes.

Solid electrolytes, also known as fast ion conductors, are materials that can function as solid state ion conductors and can be used, for example, in solid oxide fuel cells and lithium-ion batteries. In a lithium-ion battery, for example, lithium ions move from a negative electrode to a positive electrode during discharge (and back when charging) via the solid electrolyte. The solid electrolyte, such as lithium aluminum titanium phosphate (LATP), can conduct lithium ion through vacancies in the LATP crystal lattice. In Li-ion batteries, the solid electrolyte membrane can provide a hermetic barrier between the anode and the cathode in order to prevent the anode and cathode from sharing a common electrolyte solution.

Thus, important to the development of Li-ion batteries is the availability of dense, conductive lithium-ion electrolyte membranes. A major challenge for such membranes is the desire to sinter suitable materials to sufficient density such that the membrane is hermetic while providing sufficient conductivity and economy. Conventional hermetic membranes, for example, which are commonly made using a glass-ceramic process, can be made dense and hermetic, but typically at the expense of other attributes such as conductivity and cost. A challenge facing the conventional glass-ceramic process is the requirement that the desired composition form a stable glass.

In view of the foregoing, it would be desirable to develop a process for forming dense, hermetic, Li-ion conductive ceramic electrolyte membranes without such a limitation to stable glass formation. As used herein, a hermetic membrane is substantially impervious to the diffusion of liquids or gasses.

Additional features and advantages will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and together with the description serve to explain the principles and operations of the invention.

SUMMARY

Disclosed herein is a reactive sintering method for forming a Li-ion conductive ceramic electrolyte membrane. The process involves reactive sintering of at least two solid state reactants. In embodiments, the reactive components are powders that are combined, and heated to simultaneously react the components and densify the reaction product. The heating step can be used to form the reaction product into a membrane using a process such as tape casting.

A method of forming a solid lithium-ion electrolyte membrane comprises combining an amorphous, glassy, or low melting temperature solid reactant with a refractory oxide reactant to form a mixture, casting the mixture to form a green body, and sintering the green body to form a solid membrane. As used herein, a glassy material has a softening point of less than 850° C., a low melting temperature solid reactant has a melting temperature less than or equal to 850° C., and a refractory oxide has a melting temperature of greater than 850° C. Thus, in various embodiments the reactants include a glassy material and a ceramic material. The refractory oxide may be an amorphous material, including a glass. In a complementary embodiment, the reactants include at least one amorphous material, at least one glassy material, at least one low melting temperature material that are combined with at least one refractory oxide. In each of the embodiments, at least one of the reactants is an amorphous, glassy or low melting temperature solid reactant and at least one of the reactants is a refractory oxide.

Each of the reactants can comprise a powder material having, for example, a submicron particle size distribution. In an example method, the reactive sintering temperature is less than 1100° C., e.g., less than 1000° C.

Disclosed also are solid lithium-ion electrolyte membranes having a composition represented by the formula $Li_{1+x-y}M_xM'_{2-x-y}M''_y(PO_4)_3$, wherein M is a $3^+$ ion, M' is a $4^+$ ion, and M'' is a $5^+$ ion. In the foregoing, $0 \leq x \leq 2$ and $0 \leq y \leq 2$. In an example embodiment the product composition is a lithium metal phosphate having the $NaZr_2(PO_4)_3$ ("NZP") crystal structure. For example, embodiments relate to dense, hermetic $Li_{1.4}Al_{0.4}Sn_{1.6}(PO_4)_3$ lithium-ion electrolyte membranes.

The resulting membrane can have an average thickness of less than 200 microns, e.g., less than 150 microns, where the constituent electrolyte material can have an average grain size of less than 10 um, e.g., less than 1 um. For certain compositions, self-supporting ceramic membranes as thin as 30 microns can be formed.

According to a further embodiment, a solid electrolyte membrane comprises a sintered reaction product of a first powder and a second powder. The first powder comprises a first inorganic, non-lithium-ion-conductive glass or ceramic, and the second powder comprising a second inorganic, non-lithium-ion-conductive glass or ceramic. Thus, at least one of the first and second inorganic glass or ceramic powders contains lithium in composition, but is not a lithium ion conductor. In further embodiments, none of the reactants are lithium ion conductors. As defined herein, a lithium ion conductor has a conductivity of at least $10^{-6}$ S/cm.

DETAILED DESCRIPTION

Figure 1:
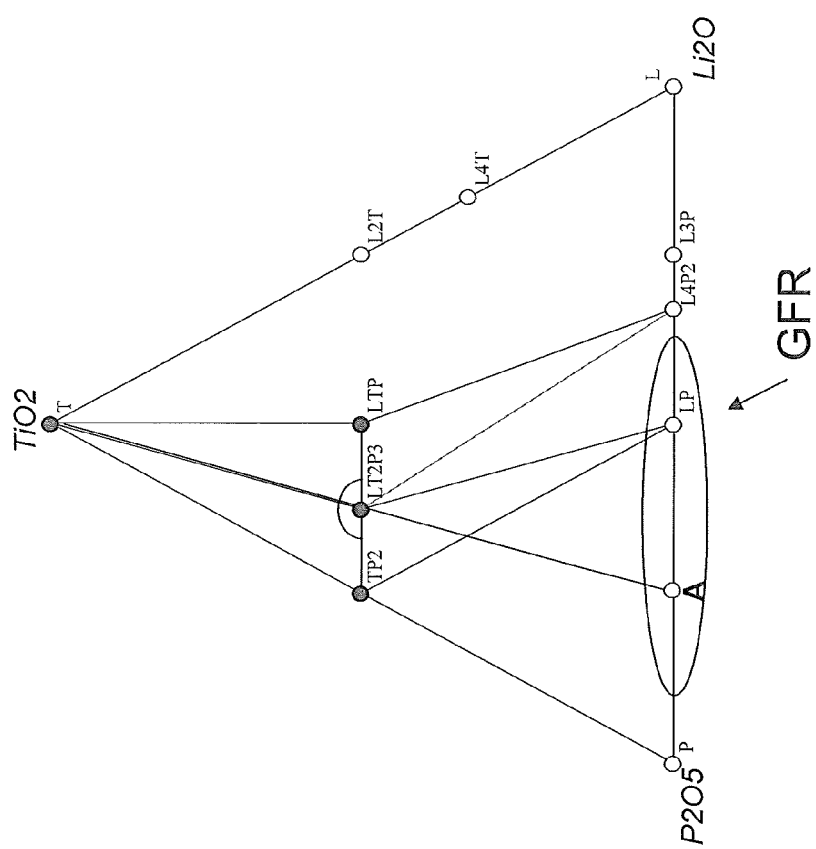
FIG. 1 is a is a schematic representation of one embodiment comprising the reaction of a lithium phosphate glass (A) with titanium dioxide to produce a water stable membrane with $LiTi_2(PO)_3$ as the major phase.

A conventional glass-ceramic approach can be used to form certain lithium metal phosphate electrolyte compositions. However, the glass-ceramic approach is inherently limited to starting compositions that can form a homogeneous glass, typically at temperatures in excess of 1000° C. Further, the sintering of ceramic Li-ion electrolyte materials to a density sufficient to produce hermetic membranes can be difficult due to the vaporization of volatile lithium and/or phosphate species at temperatures above about 1000° C. These limitations, in addition to restricting control of the process conditions, restrict the compositional space available for the optimization of important properties like conductivity and environmental stability.

According to a disclosed method of forming a solid lithium-ion electrolyte membrane, an amorphous, glassy, or low melting temperature solid reactant is combined with a refractory oxide reactant to form a mixture. The mixture is then cast to form a green body, which is sintered to form a solid membrane. Reaction of the amorphous, glassy, or low melting temperature solid with the refractory oxide to produce the final membrane composition and densification of the structure occur simultaneously, i.e., the acts of reacting and densifying at least partially overlap with one another during the heating.

In the disclosed approach, the amorphous, glassy, or low melting temperature reactant mobilizes the diffusion of reactant components, which promotes sintering, and is entirely or substantially entirely reacted and converted to the target Li-ion ceramic electrolyte composition. In this way, the advantage of a mobilizing glass or low melting temperature liquid phase is provided without the issue of environmental instability because the amorphous, glassy, or low melting temperature component is substantially consumed during the formation reaction that yields the product phase.

The amorphous, glassy, or low melting temperature reactant(s) can comprise, for example, lithium phosphate glasses or lithium aluminum phosphate glasses (e.g., 39% $Li_2O$+ 11% $Al_2O_3$+50% $P_2O_5$). Additional example glasses include germanium phosphates (e.g., 75% $GEO_2$+25% $P_2O_5$) and amorphous aluminum titanium phosphates. Further example reactants include crystallized lithium aluminum phosphate ceramics. The refractory oxides can include various oxide ceramics such as, for example, titanium oxide, tin oxide and germanium oxide (i.e., $MO_2$ oxides and ceramics).

The amorphous, glassy, or low melting temperature reactant(s) may further comprise an oxide modifier such as $TiO_2$, $GeO_2$, $SiO_2$, $B_2O_3$, $Fe_2O_3$, $Nb_2O_5$ and $SnO_2$. An oxide modifier, if used, is limited to at most 30 mol. % of the amorphous, glassy, or low melting temperature reactant. For example, the concentration of the oxide modifier can be 1, 2, 5, 10, 20, 25 or 30 mol. % of the amorphous, glassy, or low melting temperature reactant.

In embodiments, an average particle size of the respective reactants can be less than 0.5 micron (e.g., d50≤0.5 micron).

An average particle size of one or all of the reactants can be less than 0.5, 0.1, 0.05 or 0.01 microns.

The reactive sintering can be performed at a sintering temperature of less than 1100° C. (e.g., less than 1100, 1050, 1000, 950, 900 or 850° C.), and result in a solid membrane having a thickness of less than 200 microns (e.g., less than 200, 150, 100 or 50 microns). In embodiments, the maximum processing temperature (e.g., melting temperature of the glass) is less than 1300° C. (e.g., less than 1300, 1250, 1200, 1150, 1100, 1050, 1000, 950, 900 or 850° C.). By minimizing the sintering (processing) temperature, the loss of lithium or phosphate constituents can be minimized. In embodiments, a conductivity of the electrolyte membrane is greater than $10^{-4}$ S/cm (e.g., greater than $1 \times 10^{-4}$, $2 \times 10^{-4}$, $5 \times 10^{-4}$ or $1 \times 10^{-5}$ S/cm). The electrolyte membrane can be fully dense or have a density that is at least 95% (e.g., at least 95, 96, 97, 98, 99, 99.9 or 99.99%) of its theoretical density.

The invention may be better understood through the following examples.

EXAMPLE 1

LTP via LP glass and $TiO_2$

One approach to promoting sintering is to add excess lithium, which can result in the formation of low melting point lithium phosphate liquid phases. This approach may also result, however, in residual lithium phosphate phase that leaches in aqueous environments from the final membrane, resulting in mechanical weakness and/or membrane failure. According to embodiments, a water-stable membrane can be formed using a low melting point reactant that forms a liquid phase during sintering, but where the low melting point reactant is consumed during sintering.

Referring to the $Li_2O$—$TiO_2$—$P_2O_5$ composition diagram shown in FIG. 1, the water stability of the various phases indicated in this figure has been evaluated. Phases indicated with a filled circle are stable whereas phases indicated by an unfilled circle are unstable in water. Stability was determined by exposing each phase to distilled water and measuring the conductivity of the leachate. If a substantial increase in leachate conductivity was observed, the phase is considered unstable in water.

According to the present example, and still referring to FIG. 1, a lithium phosphate glass of composition "A" (25% $Li_2O$: 75% $P_2O_5$) is made by melting and quenching the appropriate composition. The glass of composition "A" is located within a glass-forming region. The glass is milled and added to milled $TiO_2$ to yield a composition nominally equivalent to $LiTi_2(PO_4)_3$ with slight $TiO_2$ excess. The milled powders are incorporated into a tape casting slip with suitable binders and rheological modifiers, cast to a green tape, dried, cut, released and sintered to make a ceramic electrolyte membrane. This process forms a water stable phase after the lithium phosphate is consumed in making the $LiTi_2(PO_4)_3$. Prior to completion of the reaction, the lithium phosphate glass provides for enhanced mobility of the reactant components, facilitating sintering and densification.

EXAMPLE 2

LATP via LAP Glass and $TiO_2$

A lithium-ion ceramic electrolyte with the composition $Li_{1+x}Al_xTi_2(PO_4)_3$ is formed. This material, which is aluminum doped, has been shown to have a high lithium ion-conductivity exceeding $10^{-4}$ S/cm.

Figure 2:
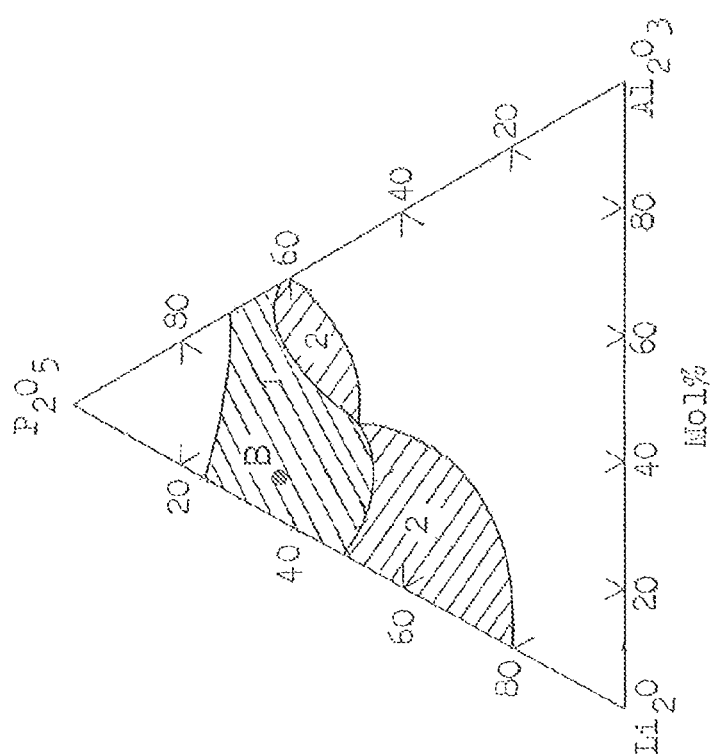
FIG. 2 is an illustration of the glass-forming regions in the $Li_2O$—$Al_2O_3$—$P_2O_5$ composition space.

Compared with the lithium phosphate glasses, $Li_2O$—$Al_2O_3$—$P_2O_5$ glasses are less hygroscopic and can be milled to submicron particle size. FIG. 2 shows the glass-forming region within the $Li_2O$—$Al_2O_3$—$P_2O_5$ "LAP" composition space. The region "1" corresponds to a compositional range that forms a clear glass upon melting, while the compositions within regions "2" form a partially crystallized glass.

In this example, an LAP glass of composition (mol. %) 29.2% $Li_2O$, 8.3% $Al_2O_3$ and 62.5% $P_2O_5$ (composition "B") was made by melting a mixture of lithium carbonate, aluminum metaphosphate and phosphoric acid in the appropriate quantities. The components were mixed in a platinum crucible, dried overnight at 250° C., and melted at 1000° C. In one case, the liquid melt was poured onto a steel plate to quench, yielding a partially-crystallized glass. Partial crystallization was identified by powder x-ray diffraction, which confirmed the formation of crystalline $Al(PO_3)_3$ in the otherwise glassy matrix. In a separate case, in addition to pouring the liquid melt onto the steel plate, the poured glass was roller quenched, which increased the quench rate and resulted in a clear glass.

The formed glass was broken up and dry milled to form a free-flowing powder. The powdered glass was mixed in a solvent mixture containing ethanol, butanol, propylene glycol and Emphos dispersant. The powder was wet-milled in a high-energy attrition mill to a particle size with d50<0.5 micron. Separately, nano-particle $TiO_2$ (Aldrich, 15 nm primary particle size) was prepared by mixing nano-$TiO_2$ in a similar solvent system and attrition milling to an agglomerate size d50<0.5 micron.

Without wishing to be bound by theory, by providing reactants having a small particle size, the particle size within the final membrane can be controlled (i.e., minimized).

Solids from the two mill batches (LAP glass, nano-$TiO_2$) were mixed to resultant composition of $Li_{1.4}Al_{0.4}Ti_{1.6}(PO_4)_3$ and further milled to promote good mixing of the two reactant materials. Polyvinylbutyral binder and a plasticizer were dissolved into the mill batch to make a tape casting slip. In embodiments, a tape casting slip can optionally include one or both of a binder and a plasticizer. The slip was tape cast, dried, released and fired at 850° C. for two hours to make a sample electrolyte membrane.

Figure 3:
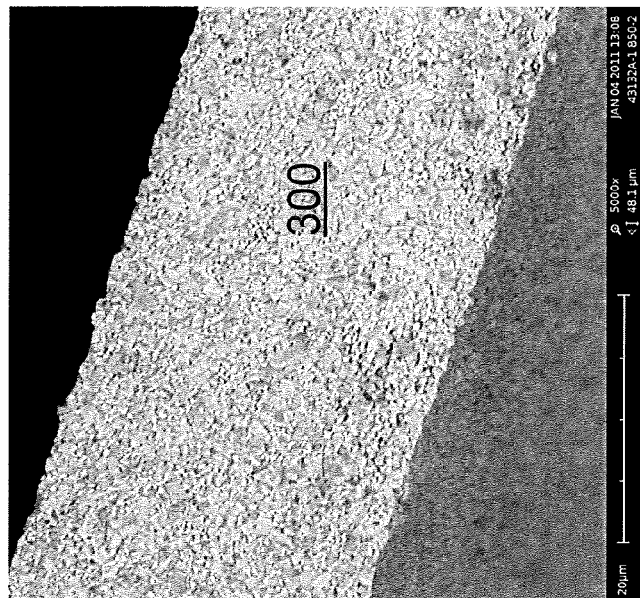
FIG. 3 is an SEM cross-sectional micrograph of an LATP membrane made according to an embodiment.

Samples from the sample membrane were cut into 1" diameter disks and characterized by SEM analysis for microstructure, XRD for phase composition and impedance spectroscopy for conductivity. A cross-section SEM image is shown in FIG. 3. The membrane 300 is free-standing (i.e., unsupported by a substrate), dense, hermetic and has an average grain size of less than 1 micron and a thickness of about 30 microns. Impedance spectroscopy shows a conductivity of $3 \times 10^{-4}$ S/cm. XRD shows reflections consistent with nearly pure $Li_{1.4}Al_{0.4}Ti_{1.6}(PO_4)_3$.

Compared with the glass-ceramic method, which can involve processing temperatures greater than 1300° C., the relatively low processing temperatures associated with the present example minimize lithium and phosphorus loss, which results in a more reproducible, lower cost process.

EXAMPLE 3—LAGP

The LAP glass described in example 2 was mixed with a mill batch containing $GeO_2$ milled to a d50 of less than 0.5 microns. A tape cast green tape was prepared in a manner similar to that used in Example 2. The tape was dried, cut, released and sintered at 900° C. for 2 hours to make a membrane sample. Samples were cut into 1" diameter disks and characterized by SEM, XRD and impedance spectroscopy. The resulting membrane is dense, hermetic and has an average grain size of less than 1 micron. XRD shows near pure $Li_{1.4}Al_{0.4}Ge_{1.6}(PO_4)_3$. A conductivity of $1.8 \times 10^{-4}$ S/cm was measured by impedance spectroscopy.

EXAMPLE 4

LASnP

The LAP glass described in Example 2 was mixed with a mill batch containing $SnO_2$ milled to a d50 of less than 0.5 microns. A tape cast green tape was prepared in a manner similar to that used in Example 2. The tape was dried, cut, released and sintered at 900° C. for 2 hours to make a membrane sample. Samples were cut into 1" diameter disks and characterized by SEM, XRD and impedance spectroscopy. The resulting membrane is dense, hermetic and has an average grain size of less than 1 micron. XRD shows near pure $Li_{1.4}Al_{0.4}Sn_{1.6}(PO_4)_3$. A conductivity of $2.1 \times 10^{-4}$ S/cm was measured by impedance spectroscopy.

Due to the limited solubility of tin oxide in glass phases, Applicants believe that the LASnP composition of the present example cannot be produced by a glass-ceramic method.

EXAMPLE 5

Modified LAP Glass

To reduce the hygroscopicity of the starting LAP glass, and to reduce milling time by increasing the glass transition temperature of the glass, the starting LAP glass may be modified by including a fraction of a transition metal desired in the final NASICON material. The table below compares hygroscopic behavior and milling times required to achieve a d50 of less than 0.5 microns for a variety of "LAP+M" melts. In Table 1, the designation "a" in the ID column represents the amount of Al substitution, i.e., Li i-paAl$_a$M2, $(PO_4)_3$. The $Li_2O$, $Al_2O_3$, $P_2O_5$, $TiO_2$ and $GeO_2$ compositions are reported in mol. %. The melting temperature $T_m$ is given in degrees Celsius. Column 9 of the Table indicates whether the glass was hygroscopic or not. In column 10, the mill time is given in hours. As seen with reference to samples 5-8, the addition of $TiO_2$ and/or $GeO_2$ can reduce the hygroscopic behavior and reduce milling time.

TABLE 1

Modified LAP glass compositions

| ID | | $Li_2O$ | $Al_2O_3$ | $P_2O_5$ | $TiO_2$ | $GeO_2$ | $T_m$ | Hyg. | mill |
|---|---|---|---|---|---|---|---|---|---|
| 1 | LATP | 0.175 | 0.050 | 0.375 | 0.400 | 0.000 | — | | |
| 2 | LP, a = 0 | 0.250 | 0.000 | 0.750 | 0.000 | 0.000 | 1100 | Yes | |
| 3 | LP + G, a = 0 | 0.225 | 0.000 | 0.675 | 0.000 | 0.100 | 1200 | Yes | |
| 4 | LAP, a = 0.2 | 0.273 | 0.045 | 0.682 | 0.000 | 0.000 | 1100 | Yes | |
| 5 | LAP + T, a = 0.2 | 0.245 | 0.041 | 0.614 | 0.100 | 0.000 | 1200 | No | |
| 6 | LAP, a = 0.4 | 0.292 | 0.083 | 0.625 | 0.000 | 0.000 | 1000 | No | 240 |
| 7 | LAP + T, a = 0.4 | 0.263 | 0.075 | 0.563 | 0.100 | 0.000 | 1300 | No | 96 |
| 8 | LAP + G, a = 0.4 | 0.263 | 0.075 | 0.563 | 0.000 | 0.100 | 1200 | No | 96 |

In Table 1, the primary phases identified by XRD for samples 5-7 were $TiP_2O_7$, $Al(PO_3)_3$, and $TiP_2O_7$, respectively. The XRD scan from sample 8 was amorphous.

EXAMPLE 6

Amorphous Flame Spray Powder

In a further embodiment, hermetic LATP membranes can be made via reactive sintering from an amorphous titanium phosphate (TP) and/or aluminum titanium phosphate (ATP) material. A flame spray pyrolysis (FSP) method was used to generate amorphous TP and ATP nanopowders. In the FSP process, Ti, Al and P precursors, such as Ti-isopropoxide, Al tri-sec butoxide, $AlCl_3$, trimethylphosphate, etc. are dissolved in an organic solvent such as ethanol, isopropanol, 2-methoxyehtanol, etc. Due to the high volatility of certain precursors, the precursor concentration in solution can be at least 30% (e.g., at least 40%) in order to minimize loss of the precursor material during combustion. In an example process, the solution is sprayed through a nozzle, which is surrounded by $CH_4/O_2$ flame, to combust the sprayed droplets. In the flame, the precursor materials react to form the nanopowder product.

TABLE 2

Precursor and powder compositions for TP and ATP materials

| Sample | Solution P/Ti | Powder P/Ti | LATP Target P/Ti |
|---|---|---|---|
| TP1 | 2.4 | 1.24 | 1.857 |
| TP2 | 2.2 | 1.48 | |
| TP3 | 1.8 | 1.48 | |

| | P/(Al + Ti) | P/(Al + Ti) | P/(Al + Ti) |
|---|---|---|---|
| ATP1 | 1.95 | 1.03 | 1.5 |
| ATP2 | 1.08 | 1.02 | |
| ATP3 | 1.27 | 1.44 | |

Figure 4:
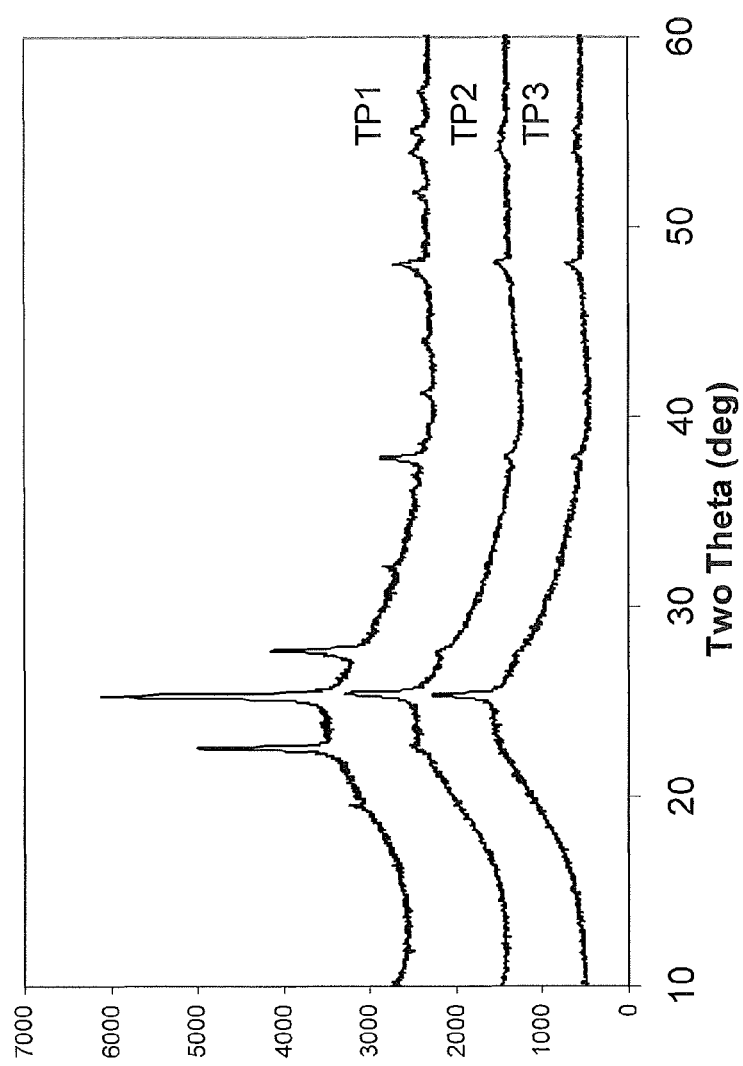
FIG. 4 is a family of XRD scans for example titanium phosphate powders.
Figure 5:
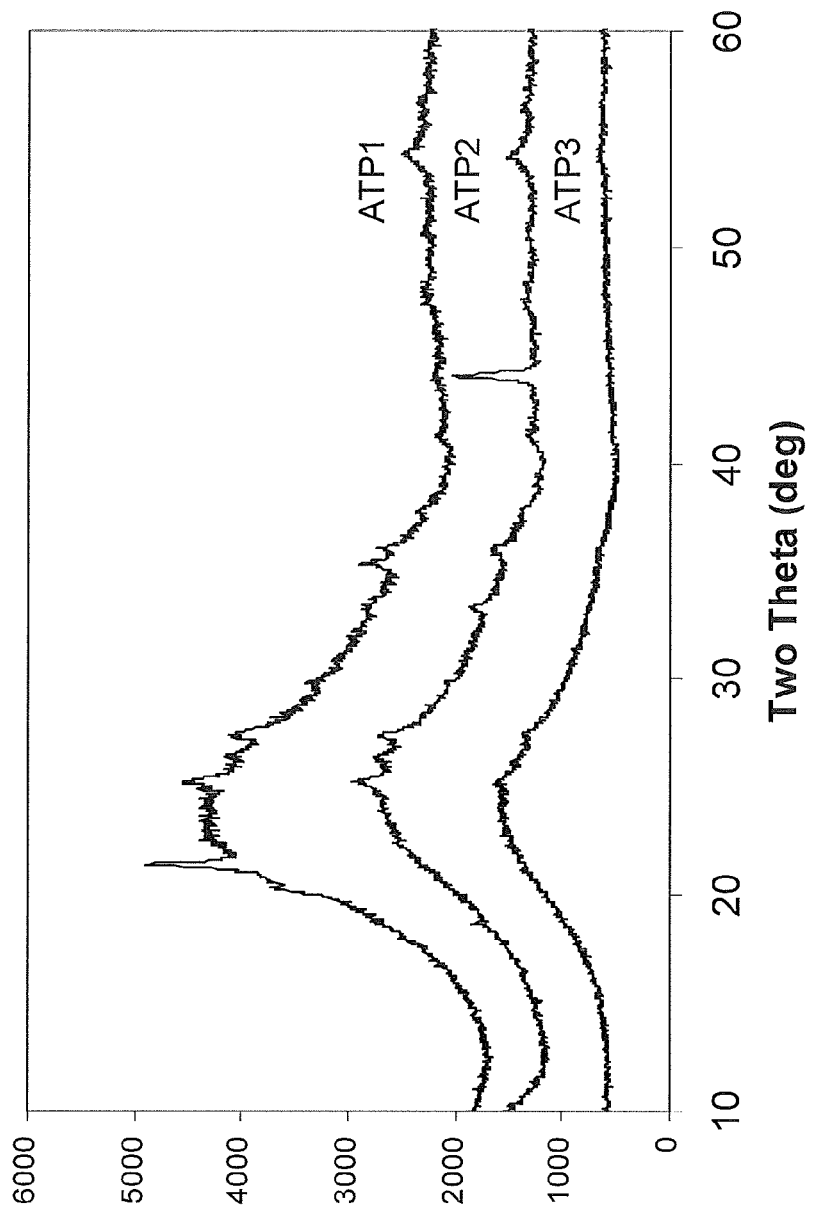
FIG. 5 is a family of XRD scans for example aluminum titanium phosphate powders.

Table 2 lists example precursor (solution) compositions together with the corresponding powder compositions for example TP and ATP materials. XRD diffraction scans for the resulting powders are shown in FIG. 4 (TP) and FIG. 5 (ATP).

In an example synthesis, a substantially amorphous ATP powder was fabricated by the flame spray pyrolysis technique. The ATP powder composition (in mol. %) was $0.1065$ $Al_2O_3 0.518$ $TiO_2$-$0.376$ $P_2O_5$. The amorphous ATP nanopowder was wet mill mixed with crystalline powders of $TiP_2O_7$, $Li_3PO_4$ and $Li_2CO_3$ and the mixture was attrition wet milled to a particle size of less than 0.5 micron. The powder mixture was tape cast and heated at 850° C. for 2 hr to form a hermetic LATP membrane with a submicron average grain size. The composition of the LATP membrane (in mol. %) was $0.175$ $Li_2O$-$0.05$ $Al_2O_3$-$0.4$ $TiO_2$-$0.375$ $P_2O_5$.

Disclosed herein is a method for making dense, hermetic, Li-ion conductive ceramic electrolyte membranes. Since a homogeneous glass starting phase is not required, the method may be applied to a much broader compositional space than is accessible using conventional glass-ceramic processes. In addition, because the reactant materials used typically have lower processing temperatures compared to those used in the glass-ceramics route, a lower cost process exhibiting better process control is achievable, especially when volatile lithium phosphate species are present.

As used herein, the singular forms "a," "an" and "the" include plural referents unless the context clearly dictates otherwise. Thus, for example, reference to a "reactant" includes examples having two or more such "reactants" unless the context clearly indicates otherwise.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It is also noted that recitations herein refer to a component of the present invention being "configured" or "adapted to" function in a particular way. In this respect, such a component is "configured" or "adapted to" embody a particular property, or function in a particular manner, where such recitations are structural recitations as opposed to recitations of intended use. More specifically, the references herein to the manner in which a component is "configured" or "adapted to" denotes an existing physical condition of the component and, as such, is to be taken as a definite recitation of the structural characteristics of the component.

It will be apparent to those skilled in the art that various modifications and variations can be made to the present invention without departing from the spirit and scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A method of forming a solid lithium-ion electrolyte membrane, comprising:
   forming a powder mixture comprising a refractory oxide reactant and at least one of an amorphous, glassy solid reactant or a low melting temperature solid reactant, the amorphous, glassy solid reactant comprising a softening point less than 850° C., and the refractory, and the low melting temperature solid reactant comprising a melting temperature less than 850° C.;
   tape-casting the powder mixture to form a green body; and
   reacting the amorphous, glassy solid reactant or the low melting temperature solid reactant to form the solid lithium-ion electrolyte membrane,
   wherein:
      the green body comprises at least one of a binder and a plasticizer, and
      an average particle size of the amorphous, glassy solid reactant or the low melting temperature solid reactant is less than 0.5 µm, and an average particle size of the refractory oxide reactant is less than 0.5 µm.

2. The method of claim 1, wherein the amorphous, glassy solid reactant or the low melting temperature solid reactant further comprises an oxide modifier.

3. The method of claim 1, wherein the binder comprises polyvinylbutyral.

4. The method of claim 1, wherein the reacting comprises sintering the green body at a temperature of less than 1100° C.

5. The method of claim 4, wherein the reacting comprises sintering the green body at a temperature of less than 850° C.

6. The method of claim 1, wherein a maximum processing temperature of the method is less than 1300° C.

7. The method of claim 6, wherein the maximum processing temperature is less than 850° C.

8. The method of claim 1, wherein the average particle size of the amorphous, glassy solid reactant or the low melting temperature solid reactant is less than 0.1 μm, and the average particle size of the refractory oxide reactant is less than 0.1 μM.

9. The method of claim 1, wherein the solid lithium-ion electrolyte membrane comprises an average thickness of less than 200 μm and is free-standing.

10. The method of claim 9, wherein the average thickness is at least 30 μm.

11. The method of claim 1, wherein the solid lithium-ion electrolyte membrane comprises an average grain size of less than 10 μm.

12. The method of claim 11, wherein the average grain size of the constituent electrolyte material is less than 1 μm.

13. The method of claim 1, wherein a conductivity of the solid lithium-ion electrolyte membrane is greater than $10^{-4}$ S/cm.

14. The method of claim 1, wherein a density of the solid lithium-ion electrolyte membrane is at least 95% of its theoretical density.

15. The method of claim 1, wherein the solid lithium-ion electrolyte membrane is hermetic such that the membrane is configured to provide a barrier between an anode and a cathode of a battery.

16. The method of claim 1, wherein the solid lithium-ion electrolyte membrane comprises a composition represented by the formula $Li_{i+x-y}MxM'_{2-x-y}M''_y(PO_4)_3$, wherein M is a $3^+$ ion, M' is a $4^+$ ion, and M" is a $5^+$ ion, $0 \leq x \leq 2$, and $0 \leq y \leq 2$.

17. The method of claim 16, wherein M is Al or Fe, M' is selected from the group consisting of Ti, Sn, Nb and Ge, and M" is Nb.

18. The method of claim 1, wherein the solid lithium-ion electrolyte membrane comprises $Li_{1.4}Al_{0.4}Sn_{1.6}(PO_4)_3$.

19. The method of claim 1, wherein the solid lithium-ion electrolyte membrane comprises a $NaZr_2(PO_4)_3$ crystal structure.

\* \* \* \* \*

UNITED STATES PATENT AND TRADEMARK OFFICE
CERTIFICATE OF CORRECTION

PATENT NO. : 11,502,330 B2  
APPLICATION NO. : 17/194775  
DATED : November 15, 2022  
INVENTOR(S) : Aitken et al.

Page 1 of 1

It is certified that error appears in the above-identified patent and that said Letters Patent is hereby corrected as shown below:

On the Title Page

On page 2, right column, In Other Publications, Line 5 (Approx.), delete "NASTCON" and insert -- NASICON --.

In the Claims

In Column 9, Line 14 (Approx.), in Claim 8, delete "μM" and insert -- μm --.
In Column 10, Line 13 (Approx.), in Claim 16, delete "$Li_{i+x-y}$" and insert -- $Li_{1+x-y}$ --.

Signed and Sealed this
Tenth Day of September, 2024

Katherine Kelly Vidal
*Director of the United States Patent and Trademark Office*